(12) United States Patent
Jass et al.

(10) Patent No.: US 11,107,083 B1
(45) Date of Patent: Aug. 31, 2021

(54) SYSTEMS AND METHODS FOR AGGREGATED DATABASE FOR CROSS-ISSUER FRAUD DETECTION SYSTEM

(71) Applicant: Vantiv, LLC, Symmes Township, OH (US)

(72) Inventors: Nicole S. Jass, Aurora, CO (US); David Mattei, Loveland, OH (US); Dennis Kettler, Lebanon, OH (US)

(73) Assignee: Worldpay, LLC, Symmes Township, OH (US)

( * ) Notice: Subject to any disclaimer, the term of this patent is extended or adjusted under 35 U.S.C. 154(b) by 575 days.

(21) Appl. No.: 15/825,225

(22) Filed: Nov. 29, 2017

(51) Int. Cl.
*G06Q 20/40* (2012.01)
*G06Q 30/02* (2012.01)
(Continued)

(52) U.S. Cl.
CPC ......... *G06Q 20/4016* (2013.01); *G06F 16/25* (2019.01); *G06F 16/437* (2019.01);
(Continued)

(58) Field of Classification Search
CPC ............. G06Q 20/405; G06Q 20/4016; G06Q 30/0201; G06Q 40/02; G06F 16/437; G06F 16/25; H04L 9/3236
See application file for complete search history.

(56) References Cited

U.S. PATENT DOCUMENTS

| 8,719,166 | B2 * | 5/2014 | Ganti | G06Q 20/4016 705/44 |
| 10,115,153 | B2 * | 10/2018 | Zoldi | G06Q 20/4016 |

(Continued)

OTHER PUBLICATIONS

T. K. Behera and S. Panigrahi, "Credit Card Fraud Detection: A Hybrid Approach Using Fuzzy Clustering & Neural Network," 2015 Second International Conference on Advances in Computing and Communication Engineering, 2015, pp. 494-499, doi: 10.1109/ICACCE.2015.33. (Year: 2015).*

*Primary Examiner* — Bruce I Ebersman
*Assistant Examiner* — Steven R Chism
(74) *Attorney, Agent, or Firm* — Bookoff McAndrews, PLLC

(57) ABSTRACT

A method for establishing fraud detection system for payment card transactions associated with an individual or a household by analyzing the online or in-store transaction against fraud detection individual profile. Generating the individual profile involves retrieving transaction data and identifying information associated with transaction authorization request, searching for another payment card using the identifying information, aggregating payment cards transaction data, generating profile data for an individual according to identifying information, transaction data, and any reported fraudulent activities under the payment cards, analyzing the transaction against the profile data to determine whether the transaction is a fraudulent activity, and providing a notification to financial institutions reporting any fraudulent activities. The fraud detection system for a household analyzes an online or in-store transaction against a household profile that associates all payment cards in consumer's household to create a complete picture of the buying behavior of the consumer household.

15 Claims, 6 Drawing Sheets

(51) Int. Cl.
*H04L 9/32* (2006.01)
*G06Q 40/02* (2012.01)
*G06F 16/25* (2019.01)
*G06F 16/435* (2019.01)

(52) U.S. Cl.
CPC ....... *G06Q 20/405* (2013.01); *G06Q 30/0201* (2013.01); *G06Q 40/02* (2013.01); *H04L 9/3236* (2013.01)

(56) References Cited

U.S. PATENT DOCUMENTS

| | | | | |
|---|---|---|---|---|
| 2008/0021801 | A1* | 1/2008 | Song | G06Q 10/0635 705/35 |
| 2011/0004498 | A1* | 1/2011 | Readshaw | G06Q 20/40 705/318 |
| 2014/0379599 | A1* | 12/2014 | Feininger | H04L 63/0421 705/325 |
| 2015/0026027 | A1* | 1/2015 | Priess | G06Q 20/4016 705/35 |
| 2015/0170175 | A1* | 6/2015 | Zhang | H04M 15/44 705/7.33 |
| 2016/0005029 | A1* | 1/2016 | Ivey | G06Q 20/409 705/44 |
| 2016/0350759 | A1* | 12/2016 | Wang | G06Q 20/405 |
| 2017/0270496 | A1* | 9/2017 | Clower | G06Q 20/3223 |

* cited by examiner

SYSTEMS AND METHODS FOR AGGREGATED DATABASE FOR CROSS-ISSUER FRAUD DETECTION SYSTEM

TECHNICAL FIELD

Various embodiments of the present disclosure relate generally to electronic payment fraud detection infrastructure and, more particularly, to an aggregated database for establishing a cross-issuer fraud detection system across multiple payment cards used by consumers.

BACKGROUND

An average consumer in the United States carries about four to six different credit and/or debit cards in their wallet and may use different cards for different types of transactions. Traditionally, financial institutions (e.g., banks) monitor an individual's credit or debit card activity to check for any fraudulent activities. Most transaction fraud systems monitor cardholders' buying behavior at the individual card level. However, monitoring transactions at the card level provides a limited view of the spending patterns of a consumer. Additionally, monitoring buying behavior for fraudulent activities at the individual card level creates problems, since some fraudulent activity may go unnoticed, whereas valid transactions may be inadvertently declined. The most common solution today is to decline suspicious transactions even without confirmation of fraud, which then typically prompts the consumer to use a different credit/debit card to complete the transaction. This practice further results in a poor consumer experience and lost revenue opportunities for the card issuer or other financial institution.

The present disclosure is directed to overcoming one or more of these above-referenced challenges.

SUMMARY OF THE DISCLOSURE

According to certain aspects of the disclosure, systems and methods are disclosed for establishing an aggregated database for operating a cross-issuer fraud detection system for payment cards used by consumers, at the wallet and/or household level.

In one embodiment, a computer-implemented method is disclosed for establishing an aggregated database for operating a cross-issuer fraud detection system for payment cards used by consumers, at the wallet and/or household level. The method includes: sending, over a computer network, an authorization request to an acquirer processor for an online or brick-and-mortar payment transaction using a first payment card, retrieving, at the acquirer processor, transaction data and identifying information associated with the authorization request before the authorization request is routed to a financial institution, and determining, by the acquirer processor, whether an individual fraud detection profile associated with the retrieved identifying information exists in a profile database.

In the above exemplary embodiment, the method further includes: analyzing, using the acquirer processor, the online or brick-and-mortar payment transaction against the individual fraud detection profile as a result of determining that the individual fraud detection profile exists, determining, using the acquirer processor, whether the online or brick-and-mortar payment transaction is a fraudulent activity, sending, over the computer network, as a result of determining that the online or brick-and-mortar payment transaction is a fraudulent activity, a notification to the financial institution for the fraudulent activity and declining, at the financial institution, the authorization request for the online or brick-and-mortar payment transaction.

In another embodiment, as a result of determining that the individual fraud detection profile does not exist, the method further comprises: storing, at a transaction database, as a result of determining that the individual's fraud detection profile does not exist, transaction data with other transaction data associated with the first payment card, searching, by the acquirer processor, for a second payment card associated using the identifying information at the transaction database, aggregating, by the acquirer processor, transaction data associated with the first and second payment cards from the transaction database, retrieving, from the at least one financial institution, reported fraudulent activities pertaining to the first and the second payment cards, generating profile data for an individual according to the at least one of the identifying information associated with the authorization request, personally identifiable information (PII) of the individual, the aggregated transaction data associated with the first and the second payment cards, and reported fraudulent activities on the first and the second payment cards, generating, by the acquirer processor, a unique hash value for the generated profile data associated with the individual, analyzing, using the acquirer processor, the online or brick-and-mortar payment transaction against the profile data, sending, over the computer network, as a result of determining that the online or brick-and-mortar payment transaction is a fraudulent activity, a notification to the financial institution reporting the fraudulent activity, and declining, at the financial institution, authorization request for the online or brick-and-mortar payment transaction.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that multiple parties may fully utilize their data without allowing others to have direct access to raw data. The disclosed systems and methods discussed below may allow advertisers to understand users' online behaviors through the indirect use of raw data and may maintain privacy of the users and the data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

As described above, there is a need for a universal fraud detection profile that associates transaction data across multiple credit and debit cards in a consumer's wallet to create a more complete picture of the buying behavior of the consumer. Transaction data may be aggregated in a cross-issuer database and indexed to consumers and/or households using identifying information associated with the transaction, such as personally identifiable information (PII) of an individual associated with the transaction, a device fingerprint, device-specific information, an originating IP address, which may be determined through IP proxy piercing, etc. The personally identifying information (PII) may be leveraged from e-commerce data, such as by e-mail address, mailing address, or other unique identifier (e.g., a hash or alpha-numeric code). This information may then be used to train and execute an aggregated fraud scoring system to better predict and act on fraudulent transactions, regardless of which issuer and/or issuer processor is associated with each card. Thus, various embodiments of the present disclosure relate generally to analyzing online or brick-and-mortar transactions for fraudulent activity across data aggregated from across card issuers according to an individual or a household fraud detection profile.

Figure 1:
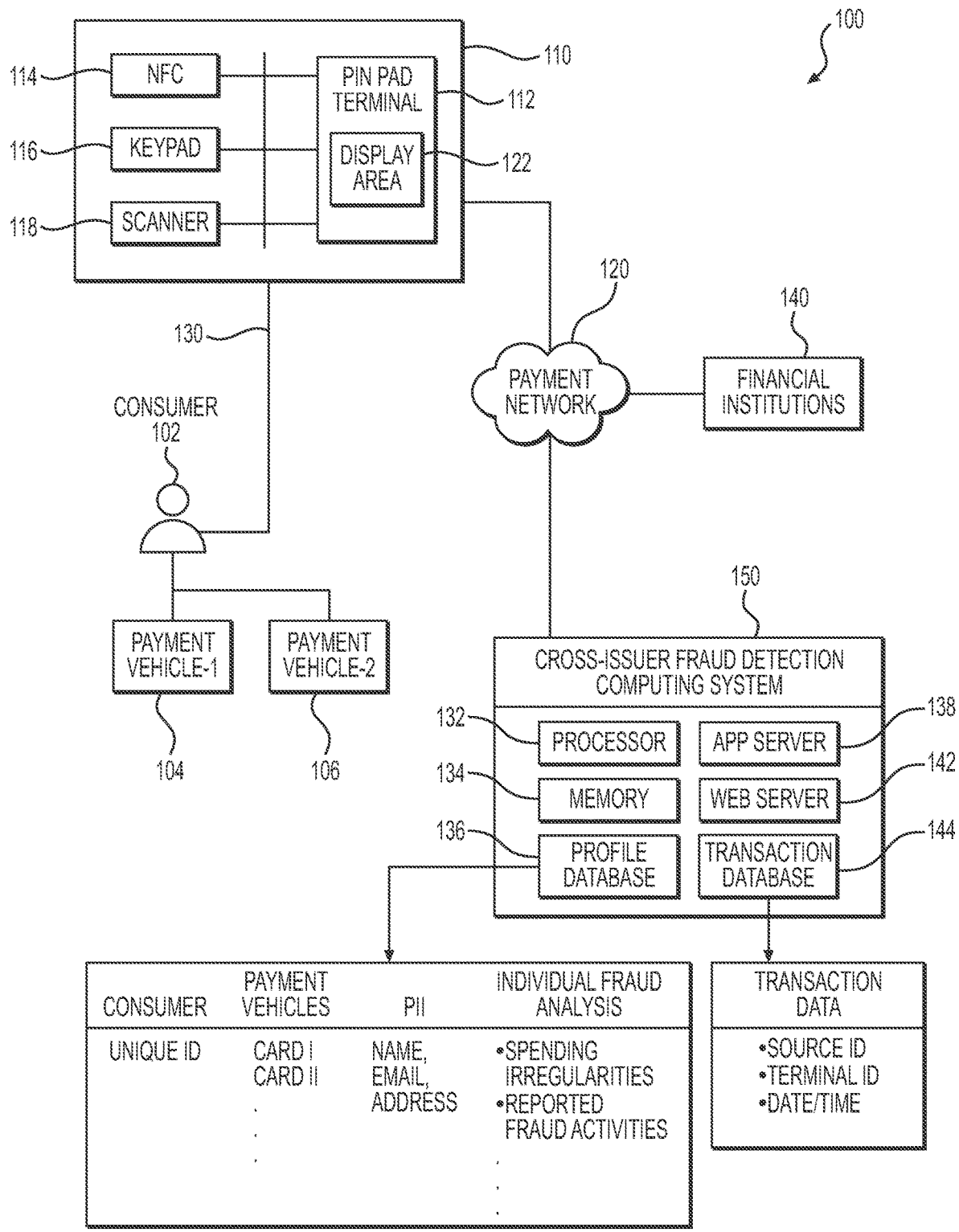
FIG. 1 depicts a block diagram of a cross-issuer fraud detection computing system infrastructure and aggregated database for establishing a cross-issuer fraud detection system for payment cards used by consumers (e.g., at the individual level).

Turning to FIG. 1, an exemplary system infrastructure is depicted for payment processing within a merchant environment, according to one or more embodiments. In an example embodiment, a consumer 102 may use one or more payment cards for conducting transactions at one or more merchants 110 through a payment environment 100. As shown in FIG. 1, merchant 110 may provide infrastructure for processing electronic payment requests. Traditionally, in an electronic payment processing system, a consumer 102, during the checkout process with a merchant 110, pays for goods or services from a merchant 110 at a PIN pad terminal 112 associated with a point-of-sale ("POS") terminal.

Because merchant 110 can generally use a different bank or financial institution 140 than consumer 102, an acquirer processor that handles financial transactions may transfer payment between the financial institution 140 of consumer 102 and that of merchant 110. Consumer 102 submits payment information at the PIN pad 112 associated with the merchant's POS terminal, such as by swiping his or her payment card, inserting his or her chip-based payment card, through wireless near field communication (NFC), etc., or by any other suitable means. PIN pad 112 may send a payment request by way of a computer network 120 to an acquirer processor (e.g., one of financial institutions 140). Alternatively, such a request may be sent by a component that controls a flow of a transaction, such as point of sale (POS) engine. The acquirer processor may request, by way of payment network 120, an electronic transfer of funds from the received funds to the financial institution 140 associated with merchant 110.

In general, a cross-issuer fraud detection computing system 150 may be operated by an acquirer processor, issuer processor, card issuer, or any other financial institution 140. The cross-issuer fraud detection computing system 150 may be operated by another entity or operated independently. In any event, cross-issuer fraud detection computing system 150 may be configured to intercept authorization requests sent across payment network 120, or otherwise receive data about payment transactions sent between merchants 110 and financial institutions 140.

In an example embodiment, as shown in FIG. 1, a cross-issuer fraud detection computing system 150 comprises a processor 132, memory 134, profile database 136, transaction database 144, application server 138, and web server 142. As shown in FIG. 1, the profile database 136 for an individual further comprises a unique identifier hash recognizing the profile of an individual, primary account numbers (e.g., PANs) or other identifiers of payment vehicles (e.g. debit, credit cards) associated with the individual, personally identifiable information (PII), and/or data/analysis of an individual's spending habits, geographic area, and fraud activities reported on the cards associated with the individual. In an example embodiment, the personally identifiable information (PII) about the individual involves at least one of his/her name, email address, date of birth, social security number, and physical address.

In the above embodiment, the cross-issuer fraud detection computing system 150 further comprises transaction database 144. The transaction database 144 comprises important transaction data associated with the payment vehicles 104 and 106. The transaction database may comprise tables containing source ID, terminal ID, date and time, IP address, location, and transaction amount for the transactions associated with payment vehicle 104 and payment vehicle 106.

Figure 2:
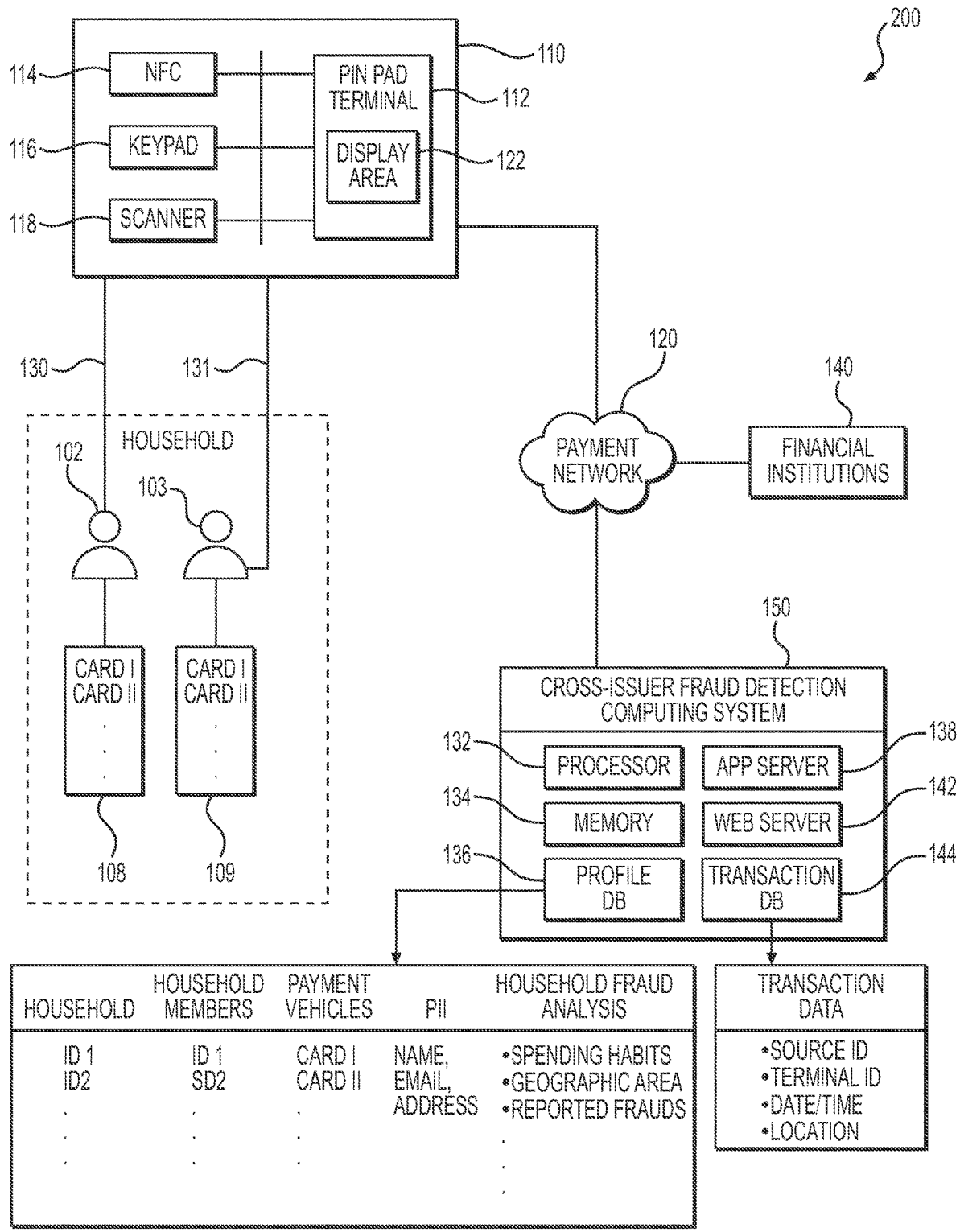
FIG. 2 depicts a block diagram of a cross-issuer fraud detection computing system infrastructure and aggregated database for establishing a cross-issuer fraud detection system for payment cards used by consumers (e.g., at the household level).

Turning to FIG. 2, a cross-issuer fraud detection computing system for a household involves multiple related individuals (e.g., consumer 102 and consumer 103) using multiple payment vehicles (e.g., 108 and 109). As shown in FIG. 2, cross-issuer fraud detection computing system 150 comprises processor 132, memory 134, profile database 136, transaction database 144, application server 138, and web server 142. The profile database 136 for a household further comprises a unique identifier hash recognizing a household, unique IDs associated with each member of the household, payment vehicles (e.g. debit, credit cards) associated with each member of the household, PII associated with each member of the household, and data/analysis of spending habits, geographic area, and reported fraud activities on the cards associated with each member of the household. In an example embodiment, the PII of each member of the household involves at least one of the member's name, email address, date of birth, and physical address.

According to one or more embodiments, the components of infrastructure 100 and 200 may be connected by a computer network 120, such as, for example a local area network (LAN) or a wireless network, such as, for example, a Wi-Fi network. However, other network connections among the components of infrastructure 100 may be used, such as, for example, a wide area network (WAN), the Internet, or the cloud. Methods of establishing fraud detection system for an individual and/or household according to one or more embodiments will be discussed with respect to FIGS. 3-4 below. Functions of the components of infrastructure 100 and 200 will be described below with respect to exemplary methods for cross-issuer fraud detection computing systems for individuals and households.

FIGS. 1 and 2 and the discussion above provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 1 and 2. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 3:
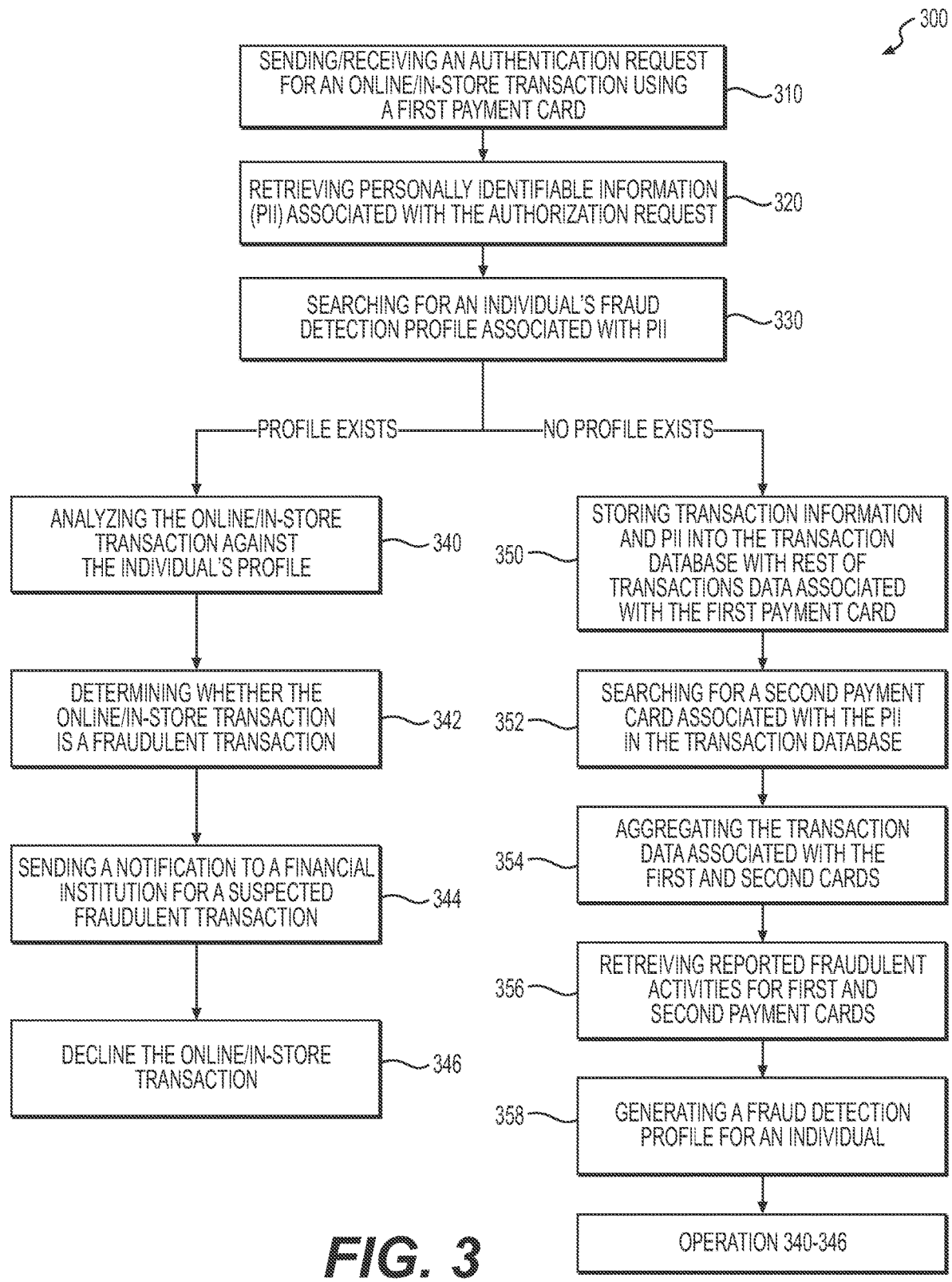
FIG. 3 depicts a flowchart of a method for establishing a cross-issuer fraud detection computing system and aggregated database for establishing a cross-issuer fraud detection system for payment cards for individuals, according to one or more embodiments.

FIG. 3 illustrates a method 300 for establishing a cross-issuer (e.g., a so-called "wallet-based") fraud detection system for an individual. The cross-issuer fraud detection system may be referred to as "wallet-based" because it may enable analysis and synthesizing of transaction and fraud data across all credit/debit cards within a consumer's wallet, regardless of issuer. As described above with respect to FIGS. 1-2, a merchant 110 may request authorization for a transaction initiated using a payment vehicle or card 104-109. In an example embodiment, the transaction may be for purchase of an item or a service, or for a withdrawal of cash. Thus, at step 310 of method 300 (FIG. 3), a merchant 110 may send (or an acquirer processor may receive) an authorization request for an online or brick-and-mortar transaction over a wireless network. Such an authorization request may be intercepted by or otherwise received at processor 132 of fraud detection computing system 150. At step 320, the processor 132 may retrieve identifying information associated with the transaction and transaction data from the authorization request before the authorization request is routed to a financial institution. The identifying information may include, for example, personally identifiable information (PII) of an individual associated with the transaction, a device fingerprint, device-specific information, an originating IP address, which may be determined through IP proxy piercing, etc. Further, at step 330, the processor 132 may search a profile database 136 for a fraud detection profile associated with the identifying information associated with the transaction.

In an example embodiment, if the processor 132 finds profile associated with the identifying information associated with the transaction in profile database 136, the acquirer processor may further analyze the transaction against the profile to determine whether the online or in-store transaction is fraudulent, as per steps 340 and 342. If the processor 132 determines, e.g., at step 342, that the transaction is fraudulent, then the acquirer processor may further send a notification to the web server 142 along with the authorization request, at step 344, which is sent to a financial institution 140. Financial institution 140 may, based on the fraud message, decline the transaction according to the notification provided by the processor 132, at step 346. The transaction data may comprise at least one of a merchant's ID, transaction location, terminal information, source IP address, date and time of the transaction, device information, transaction amount of the purchase, and payment card information.

In another embodiment, if the processor 132 does not find a profile within the profile database 136, the processor 132 may store the transaction in a transaction database 144. The processor 132 may further search for any additional payment cards associated with the retrieved identifying information associated with the transaction from the transaction database 144. The processor 132 may aggregate transaction data associated with payment card(s) from the transaction database 144. The processor 132 may retrieve any reported fraudulent activities from at least one financial institution 140 associated with the payment cards as per operation 356. At step 358, the processor 132 may generate a profile for an individual according to the retrieved identifying information associated with the transaction, aggregated transaction data from the payment cards, and reported fraudulent activities from at least one financial institution 140. The acquirer processor 132 may also generate a unique hash value for the generated profile data for the individual (e.g., consumer 102). Once the profile data for the individual is generated, the processor 132 may analyze the online or brick-and-mortar transaction against the generated profile according to operation 340, and further determine whether the transaction is fraudulent as per step 342.

In the above-illustrated embodiment, the processor 132 may notify the financial institution 140 associated with the transaction if it determines the transaction to be fraudulent. The processor 132 may attach the notification to the authorization request before sending the authorization request to the web server 142 communicating with the financial institution 140. In another embodiment, the processor 132 may attach the fraudulent activity analysis to the authorization request before sending the request to the financial institution 140.

In an exemplary embodiment, the authorization request may be presented with the fraudulent activity analysis report at the graphical user interface associated with the web server 142. In another embodiment, the processor 132 may determine whether to decline or approve the transaction without involving the financial institution 140.

The method of establishing the cross-issuer fraud detection computing system disclosed herein may provide a multidimensional score for one in-store or online transactions for presentation to and use by a variety of different merchants and issuers. For example, the multidimensional fraud score may determine and communicate the likelihood of the transaction being fraudulent according to the cross-issuer analysis of the transaction in operation 340.

In one embodiment, the individual profile data are at least one of the individual's spending irregularities and analysis of reported fraudulent activity associated with the payment cards linked to the individual. The spending irregularities of the individual are computed according to the individual's spending habits, geographic area, and type of payment cards used for those payments. Additionally, the personally identifiable information (PII) comprises at least one of a name, physical address, email address, etc. of the individual, wherein the payment cards 104 and 106 are debit or credit cards issued by at least one financial institution. In the exemplary embodiment, the microprocessor-enabled payment vehicles are payment cards using computer chips to authenticate transactions according to Europay, MasterCard, and Visa (EMV) global standard. The contactless payment vehicles are either EMV or NFC compatible payment cards.

Figure 4:
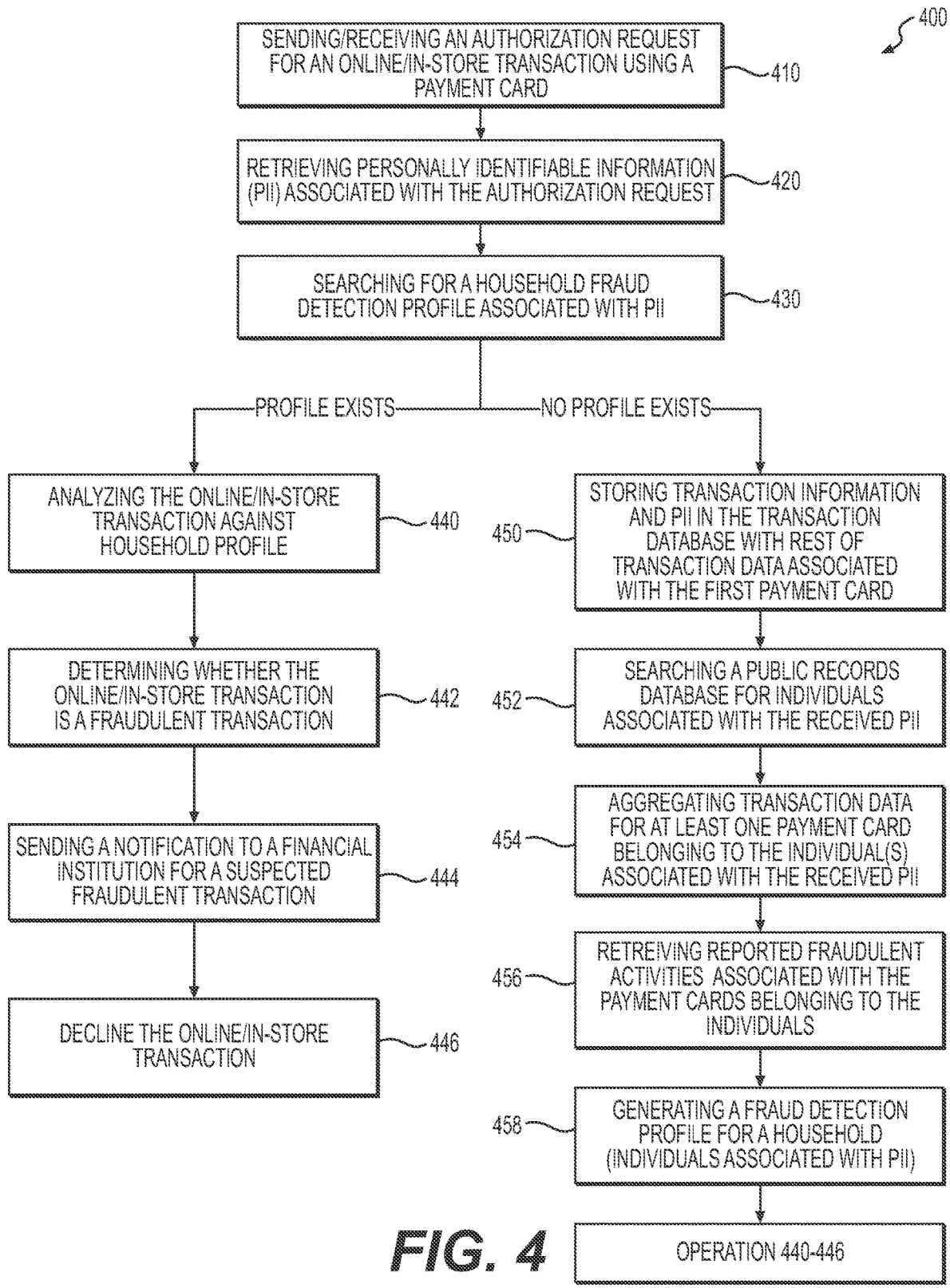
FIG. 4 depicts a flowchart of a method for establishing a cross-issuer fraud detection computing system and aggregated database for establishing a cross-issuer fraud detection system for payment cards for households, according to one or more embodiments.

Turning to FIG. 4, exemplary systems and processes are disclosed for establishing a cross-issuer fraud detection system for a household. One of the members of a household may purchase a good or service at the merchant 110, either online or in-store, using one of the payment vehicles (e.g., 106, 108). The merchant 110 may send the authorization request to the processor 132 over a computer network. The processor 132 may retrieve transaction data and identifying information associated with the transaction from the authorization request before the authorization request is routed to a financial institution 140. The identifying information may include, for example, personally identifiable information (PII) of an individual associated with the transaction, a device fingerprint, device-specific information, an originating IP address, which may be determined through IP proxy piercing, etc.

The processor 132 may further search whether a household fraud detection profile for the retrieved identifying information associated with the transaction exists in a profile database 136. If the processor 132 determines that no household profile exists for retrieved identifying information associated with the transaction, the acquirer processor stores the transaction data with the rest of the transaction data associated with the payment card at the merchant 110.

The processor 132 further searches a public records database and profile database for individuals associated with the retrieved identifying information associated with the transaction. The processor 132 also may search for payment cards associated with members of a household using the retrieved identifying information associated with the transaction in the transaction database 144. The processor 132 may aggregate transaction data from the transaction database 144 for the at least one payment card(s) belonging to the individuals associated with the received identifying information associated with the transaction. The processor 132 also may retrieve reported fraudulent activities pertaining to the payment cards from the at least one financial institution 140.

In the above-explained embodiment, the processor 132 may generate household profile data involving each member of the household according to the retrieved identifying information associated with the transaction, PII of the individual, the aggregated transaction data associated with the payment cards, and reported fraudulent activities on the payment cards. The processor 132 further generates the household profile presenting the household member's spending irregularities and suspicious activities associated with the at least one payment cards linked to the household profile. In the above exemplary embodiment, the household member's spending irregularities are calculated based on at least one of the member's spending habits, geographic area, and type of payment cards.

The acquirer processor further generates a unique hash value for generated household profile data and links the members of the household profile with the generated unique hash value. In another embodiment, if only one individual's information is retrieved, the processor 132 may generate an individual profile over household profile data.

In an alternative embodiment, the processor 132 may search the profile database 136 to find individual profiles related to retrieved identifying information associated with the transaction. The processor 132 may link the unique hash value associated with individual profiles to the household profile hash value for the household members with individual profiles. In the above embodiment, the linking profile data may comprise generating, a rollup identifier identifying the household, wherein the rollup identifier provides a pointer to the unique hash value associated with the profile data of household members, and wherein the rollup identifier is common to a plurality of household members.

In a different exemplary embodiment, the processor 132 may search for both household profile and an individual profile for the retrieved identifying information associated with the transaction in the prolife database 136. The search derives either the household or an individual profile for the retrieved identifying information associated with the transaction in the profile database 136.

In an example embodiment, the processor 132 may analyze the online or in-store transaction against the profile data associated with each member of the household as per operation. The processor 132 may send a notification to the financial institution reporting any online or in-store transaction is determined to be fraudulent. The financial institution 140 may decline the online or in-store transaction according to the notification provided from the processor 132 as per operation 446.

In one embodiment, the processor 132 may generate a multidimensional score for the online or in-store transaction according to the household profile. The acquirer processor may provide score embedded to every transaction to the financial institution 140. The multidimensional score may be a score representing the probability that the transaction is fraudulent.

Figure 5:
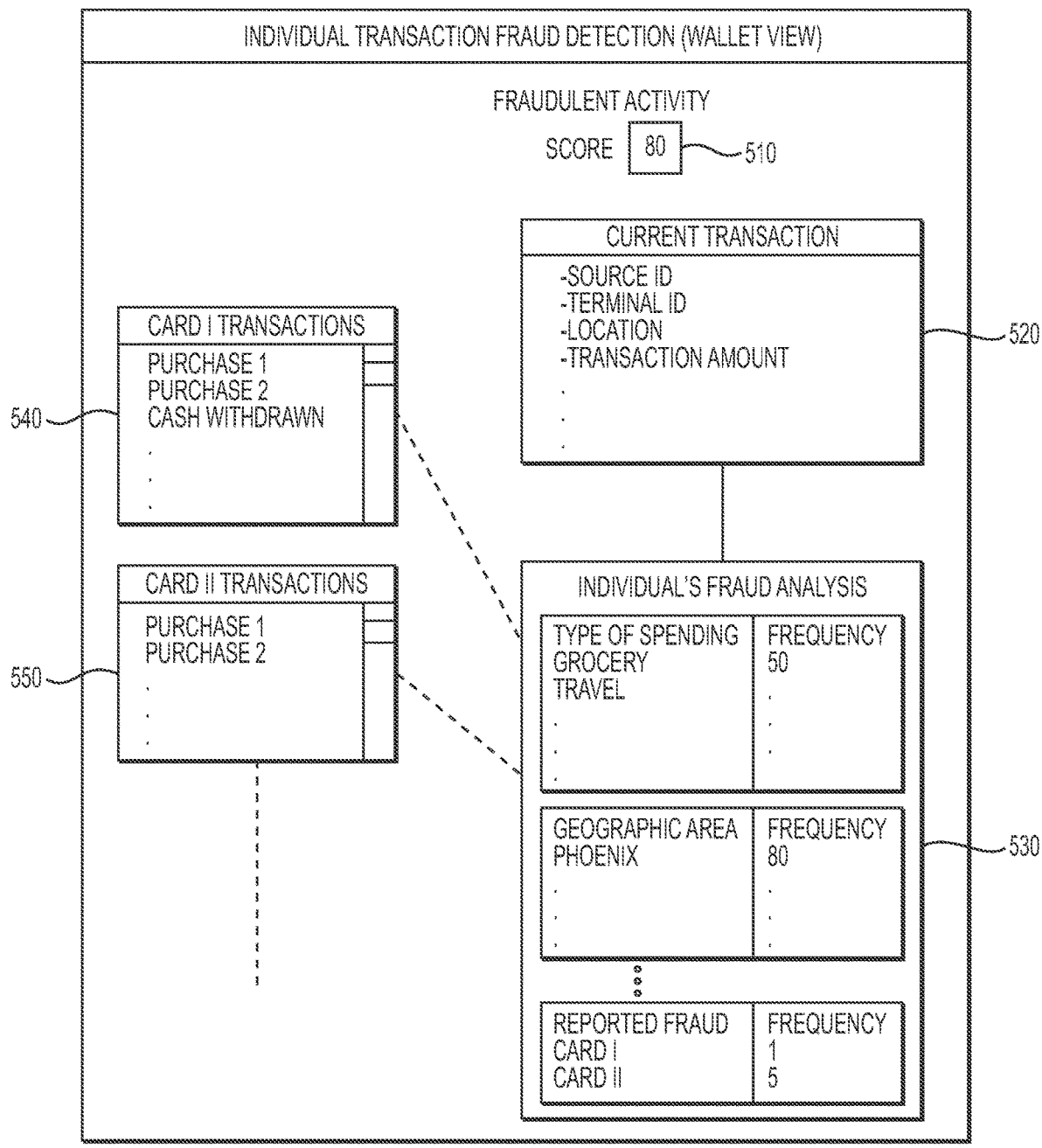
FIG. 5 depicts a screenshot of an exemplary presentation of an individual (e.g., "wallet level") cross-issuer fraud detection analysis to a financial institution, according to one or more embodiments.

FIG. 5 is an example representation of transaction analysis presented to the financial institution 140. The presentation further provides transaction data to view to the financial institution, e.g., at step 520. The individual fraud analysis (step 530) may include determining frequencies of spending habits, irregularities, geographic area and reported fraudulent activities. The fraudulent activity score 510 may be determined according to the frequencies of spending habits, irregularities, geographic area and reported fraudulent activities, as shown in step 530.

Figure 6:
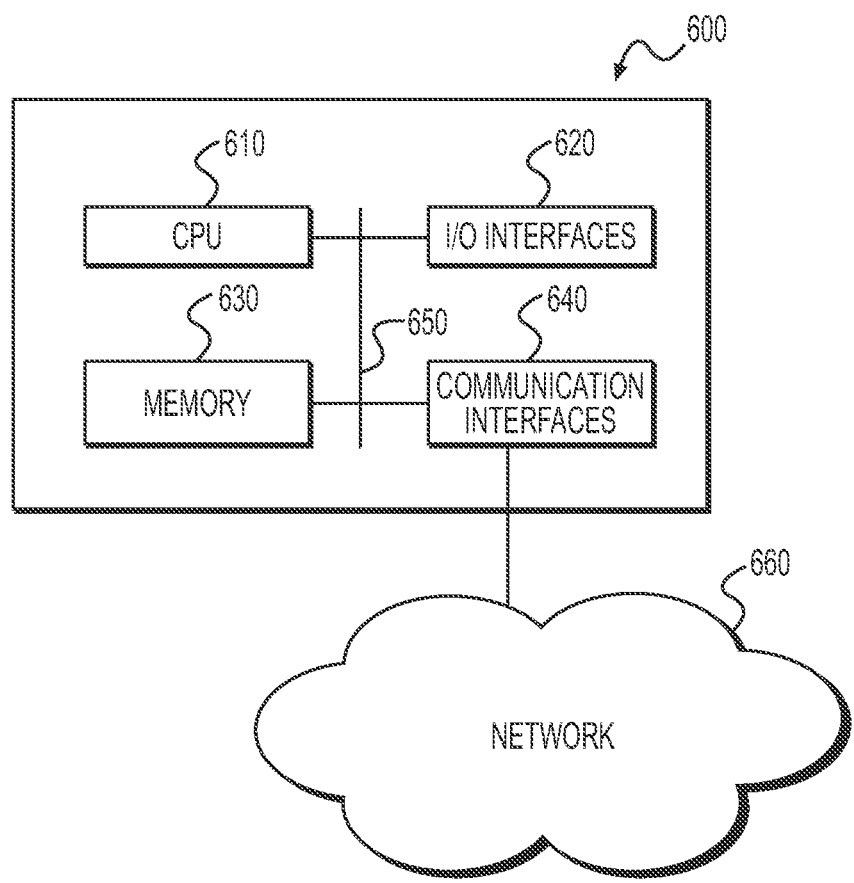
FIG. 6 depicts an example of a computing device for establishing a cross-issuer fraud detection computing system and aggregated database for establishing a cross-issuer fraud detection system for payment cards.

The systems and processes described above by the acquirer processor may be performed on or between one or more computing devices. FIG. 6 illustrates an example computing device. A computing device 600 may be a server, a computing device that is integrated with other systems or subsystems, a mobile computing device such as a smart phone, a cloud-based computing ability, and so forth. The computing device 600 may be any suitable computing device as would be understood in the art, including without limitation, a custom chip, and embedded processing device, a tablet computing device, a POS terminal associated with the merchant 110, a back-office system of a merchant 110, a personal data assistant (PDA), a desktop, laptop, microcomputer, and minicomputer, a server, a mainframe, or any other suitable programmable device. In various embodiments disclosed herein, a single component may be replaced by multiple components and multiple components may be replaced by a single component to perform a given function or functions. Except where such substitution would not be operative, such substitution is within the intended scope of the embodiments.

The computing device 600 includes a processor 610 that may be any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources may also include distributed computing devices, cloud computing resources, and virtual computing resources in general.

The computing device 600 also includes one or more memories 630, for example read-only memory (ROM), random access memory (RAM), cache memory associated with the processor 610, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 600 also includes storage media such as a storage device that may be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 610, or memories 630 are also contemplated as storage devices. It may be appreciated that such memory may be internal or external with respect to operation of the disclosed embodiments. It may be appreciated that certain portions of the processes described herein may be performed using instructions stored on a computer readable medium or media that direct computer system to perform the process steps. Non-transitory computable-readable media, as used herein, comprises all computer-readable media except for transitory, propagating signals.

Networking communication interfaces 640 may be configured to transmit to, or receive data from, other computing devices 600 across a network 660. The network and communication interfaces 640 may be an Ethernet interface, a radio interface, a Universal Serial Bus (USB) interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 640 may include wire data transmission links such as Ethernet and TCP/IP. The communication interfaces 640 may include wireless protocols for interfacing with private or public networks 660. For example, the network and communication interfaces 640 and protocols may include interfaces for communicating with private wireless networks such as Wi-Fi network, one of the IEEE 802.11x family of networks, or another suitable wireless network. The network and communication interfaces 640 may include interfaces and protocols for communicating with public wireless networks 660, using for example wireless protocols used by cellular network providers, including Code Division Multiple Access (CDMA) and Global System for Mobile Communications (GSM). A computing device 600 may use network and communication interfaces 640 to communicate with hardware modules such as a database or data store, or one or more servers or other networked computing resources. Data may be encrypted or protected from unauthorized access.

In various configurations, the computing device 600 may include a system bus 650 for interconnecting the various components of the computing device 600, or the computing device 600 may be integrated into one or more chips such as programmable logic device or application specific integrated circuit (ASIC). The system bus 650 may include a memory controller, a local bus, or a peripheral bus for supporting input and output devices 620, and communication interfaces 640. Example input and output devices 620 include keyboards, keypads, gesture or graphical input devices, motion input devices, touchscreen interfaces, one or more displays, audio units, voice recognition units, vibratory devices, computer mice, and any other suitable user interface.

The processor 610 and memory 630 may include non-volatile memory for storing computable-readable instructions, data, data structures, program modules, code, microcode, and other software components for storing the computer-readable instructions in non-transitory computable-readable mediums in connection with the other hardware components for carrying out the methodologies described herein. Software components may include source code, compiled code, interpreted code, executable code, static code, dynamic code, encrypted code, or any other suitable type of code or computer instructions implemented using any suitable high-level, low-level, object-oriented, visual, compiled, or interpreted programming language.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for fraud detection for an individual, the method comprising:
    sending, over a computer network, an authorization request to an acquirer processor for a payment transaction using a first payment card;
    retrieving, at the acquirer processor, transaction data and identifying information associated with the authorization request before the authorization request is routed to a financial institution;
    determining, by the acquirer processor, whether an individual fraud detection profile associated with the retrieved identifying information exists in a profile database;
    storing, at a transaction database, as a result of determining that the individual's fraud detection profile does not exist, transaction data with other transaction data associated with the first payment card;
    upon determining that an individual fraud detection profile associated with the retrieved identifying information does not exist in the profile database, searching, by the acquirer processor using the identifying information at the transaction database, for a second payment card associated with the identifying information, the second payment card associated with the identifying information not being previously linked to the first payment card;
    aggregating, by the acquirer processor, transaction data associated with the first and second payment cards from the transaction database;
    retrieving, from the financial institution, reported fraudulent activities pertaining to the first and second payment cards;
    generating, profile data for the individual according to at least one of the identifying information associated with the authorization request, personally identifiable information (PII) of the individual, the aggregated transaction data associated with the first and second payment cards, and reported fraudulent activities on the first and second payment cards;
    generating, at the acquirer processor, a multidimensional score for the aggregated transaction data associated with the first and second payment cards;
    generating, by the acquirer processor, a unique hash value for the generated profile data associated with the individual;
    analyzing, by the acquirer processor, the payment transaction against the profile data;
    declining, by the acquirer processor, as a result of determining that the payment transaction is a fraudulent activity, the authorization request for the payment transaction; and
    sending, over the computer network, a notification to a web server associated with the financial institution reporting the fraudulent activity.

2. The method of claim 1, wherein the individual's profile data includes at least one of spending irregularities of the individual, and fraud analysis according to the reported fraudulent activities associated with the first and second payment cards.

3. The method of claim 2, wherein the spending irregularities of the individual are calculated based on at least one of spending habits of the individual, a geographic area, and a type of payment card of the individual.

4. The method of claim 1, further comprising, flagging, by the acquirer processor, any fraudulent suspicion pertaining to the at least one online or in-store transaction to the at least one financial institution.

5. The method of claim 1, wherein the personally identifiable information (PII) comprises at least one of name, physical address, and email address.

6. The method of claim 1, the transaction data comprises of at least one of merchant's ID, transaction location and terminal information, source IP address, data and time, device information, transaction amount of the payment transaction, and the payment card information.

7. The method of claim 1, wherein the first and second payment cards are debit or credit cards issued by the at least one financial institution.

8. The method of claim 1, wherein the searching whether the individual fraud detection profile associated with the retrieved identifying information associated with the authorization request exists includes searching for a unique hash value associated with an individual fraud detection profile for the retrieved identifying information associated with the authorization request in the profile database.

9. A method for fraud detection for a household, the method comprising:
    sending, over a computer network, an authorization request to an acquirer processor for a payment transaction using a payment card;
    retrieving, at the acquirer processor, transaction data and identifying information associated with the authorization request before the authorization request is routed to a financial institution;
    searching and determining, by the acquirer processor, whether a household fraud detection profile associated with the retrieved identifying information associated with the authorization request exists in a profile database;
    storing, at a transaction database, as a result of determining that the household fraud detection profile does not exist, transaction data with other transaction data associated with the payment card;
    searching and determining, by the acquirer processor, payment cards associated with members of the household using retrieved identifying information associated with the authorization request in the transaction database;
    aggregating, by the acquirer processor, transaction data associated with the payment cards from the transaction database, the payment cards not being previously linked;
    retrieving, from at least one financial institution, reported fraudulent activities pertaining to the payment cards;
    generating, profile data for each member of the household according to the at least one of the identifying information associated with the authorization request, personally identifiable information (PII) of each member of the household, the aggregated transaction data associated with the payment cards, and reported fraudulent activities on the payment cards;

generating, at the acquirer processor, a multidimensional score for the aggregated transaction data associated with the payment cards;

generating, by the acquirer processor, a unique hash value for the generated profile data associated with the members of household;

linking, by the acquirer processor, the unique hash value for the profile data associated with the members of the household to a unique hash value for a household;

analyzing, using the acquirer processor, the payment transaction against the profile data associated with each member of the household;

declining, by the acquirer processor, as a result of determining that the payment transaction is a fraudulent activity, the authorization request for the payment transaction; and sending, over the computer network, a notification to the financial institution reporting the fraudulent activity.

10. The method of claim 9, further comprising, generating the household profile presenting spending irregularities of each member of the household, and suspicious activities associated with the at least one payment cards linked to the household profile.

11. The method of claim 10, wherein the spending irregularities of each member of the household are calculated based on at least one of spending habits of each member of the household, a geographic area of each member of the household, and a type of payment cards of each member of the household.

12. A system for wallet based fraud detection for an individual, the system comprising:

a memory having processor-readable instructions stored therein; and a processor configured to access the memory and execute the processor-readable instructions, which when executed by the processor configures the processor to perform a plurality of functions, including functions to:

send, over a computer network, an authorization request to an acquirer processor for a payment transaction using a first payment card;

retrieve transaction data and identifying information associated with the authorization request before the authorization request is routed to a financial institution;

search and determine whether an individual fraud detection profile associated with the retrieved identifying information associated with the authorization request exists in a profile database;

store, at a transaction database, as a result of determining that the individual's fraud detection profile does not exist, transaction data with other transaction data associated with the first payment card;

search for a second payment card associated with the individual using the identifying information associated with the authorization request at the transaction database;

aggregate transaction data associated with the first and second payment cards from the transaction database, the second payment card not being previously linked to the first payment card;

retrieve, from at least one financial institution, reported fraudulent activities pertaining to the first and second payment cards;

generate, profile data for an individual according to the at least one of the identifying information associated with the authorization request, personally identifiable information (PII) of the individual, the aggregated transaction data associated with the first and second payment cards, and reported fraudulent activities on the first and second payment cards;

generate a multidimensional score for the aggregated transaction data associated with the first and second payment cards;

generate a unique hash value for the generated profile data associated with the individual;

analyze the payment transaction against the profile data;

decline, as a result of determining that the payment transaction is a fraudulent activity, the authorization request for the payment transaction; and send, over the computer network, a notification to a web server associated with the financial institution reporting the fraudulent activity.

13. The system of claim 12, wherein the analysis of the payment transaction against the profile data is according to spending irregularities of the individual, and suspicious activities associated with the first and second payment cards.

14. The system of claim 13, wherein the spending irregularities of the individual are calculated based on at least one of spending habits of the individual, geographic area of the individual, and a type of payment card of the individual.

15. The system of claim 12, further comprising a function to send the multidimensional score to the web server associated with the financial institution.

* * * * *